United States Patent [19]

Abboud

[11] Patent Number: 5,179,712

[45] Date of Patent: Jan. 12, 1993

[54] RANK CELL ARRAY STRUCTURE FOR SORTING BY EACH CELL COMPARING THE CELL VALUE TO PREVIOUS CELL VALUE, NEXT CELL VALUE, IN VALUE AND OUT VALUE

[75] Inventor: William J. Abboud, Chino Hills, Calif.

[73] Assignee: Hughes Aircraft Company, Los Angeles, Calif.

[21] Appl. No.: 394,468

[22] Filed: Aug. 16, 1989

[51] Int. Cl.$^5$ .......................... G06F 7/08; G06F 7/02
[52] U.S. Cl. ............................ 395/800; 364/223.1; 364/259.2; 364/922.5; 364/923.4; 364/951.0; 364/DIG. 1; 340/146.2; 371/67.1; 342/93
[58] Field of Search ... 364/200 MS File, 900 MS File; 342/93; 395/800; 371/67.1; 340/146.2

[56] References Cited

U.S. PATENT DOCUMENTS

| | | | |
|---|---|---|---|
| 4,110,837 | 8/1978 | Chen | 364/900 |
| 4,514,826 | 4/1985 | Iwata et al. | 364/900 |
| 4,567,572 | 1/1986 | Morris et al. | 364/900 |
| 4,649,394 | 3/1987 | Minker et al. | 342/94 |

*Primary Examiner*—Thomas C. Lee
*Assistant Examiner*—Ken S. Kim
*Attorney, Agent, or Firm*—Wanda K. Denson-Low

[57] ABSTRACT

A rank cell array for ranking a series of sample values including a number of identical rank cells (RC1, RC2...) permitting ready modification of the sorting window size in an OS CFAR radar application, for example. Each rank cell (RC1, RC2...) includes a multiplexer (49), a D flip-flop (41), first and second comparators (43, 45), and a multiplexer controller (49). Each clock interval, the foregoing circuitry examines the sample value entering the sorting window, the sample value leaving the sorting window, the sample value in the preceding rank cell, and the sample value in the succeeding rank cell to determine the sample value in the rank cell during the next clock interval.

3 Claims, 6 Drawing Sheets

RANK CELL ARRAY STRUCTURE FOR SORTING BY EACH CELL COMPARING THE CELL VALUE TO PREVIOUS CELL VALUE, NEXT CELL VALUE, IN VALUE AND OUT VALUE

BACKGROUND OF THE INVENTION

1. Field of the Invention

The subject invention relates to circuitry for rank ordering a set of numbers, and particularly to such a circuit having the capability to adjust rank in a single clock cycle. The circuit features improved flexibility over the prior art and is particularly applicable to radars which employ OS CFAR detection, while having broad applications in many other number ranking contexts.

2. Description of Related Art

An improved method of computing thresholds for a radar detector is described in "Radar CFAR Thresholding in Clutter and Multiple Target Situations" by Herman Rohling in IEEE Transactions on Aerospace and Electronic Systems, Vol. AES-19, No. 3, July 1983. This method is referred to as OS CFAR, which stands for "ordered statistic constant false alarm rate." This OS CFAR method offers several important advantages over presently-used CFAR (Constant False Alarm Rate) methods. Such presently-used methods employ a CFAR circuit which computes a mean level based on the arithmetic average of the video in the area around the sample of interest. As explained by Rohling, this cell averaging method does not perform well in the presence of clutter or multiple targets. An Ordered Statistic (OS) CFAR can provide performance which is nearly equal to the cell average method when in a noise only environment, and can provide improved performance when operating in an environment containing clutter and/or multiple targets.

An OS CFAR Detector performs the following functions:

1. Inputs all video samples within N/2 samples on either side of the sample cell which is being examined for the presence or absence of a Target. "N" is referred to as the size of the "window" examined by the circuit.

2. Examines the amplitude of the N samples and assigns each of them a rank according to relative amplitude. This is analogous to sorting N different numbers in order by the values of the numbers.

3. Selects the sample which has a Predetermined Rank (RT) from the sample set. The amplitude of this sample is used as a basis for setting the Target Detection Threshold.

4. Determines the number of samples (Nc) which exceeds the average noise level by a predetermined amount. When this number exceeds certain predetermined values the circuit will adjust RT to prevent an increase of the false alarm rate in severe clutter. As RT changes the circuit automatically adjusts the detection Threshold offset (TD) to maintain the desired probability of false alarm.

All of the above functions must be performed for each video sample point and in a parallel fashion such that the detection function can take place in real time at a rate that matches the video bandwidth.

As may be appreciated, an essential feature of an OS CFAR detector is the ability to rank order a set of numbers. Prior methods used for rank ordering a set of numbers involve algorithms implemented on programmable computers. These algorithms require multiple passes through the sample set. Each pass requires moving data among locations in memory and comparing operations in an arithmetic logic unit (ALU). The disadvantage of these prior techniques is that they are extremely slow.

It may further be seen that in the OS CFAR application, the sample cell or test cell is excluded from the ranking process. U.S. Pat. No. 4,649,394 to Minker and Rohling discloses an OS CFAR radar in which rank ordering is proposed, but does not disclose circuitry capable of rank ordering the number set while excluding the sample or test cell from the ranking process. Such capability is also lacking in other number ranking circuits, for example, as disclosed in U.S. Pat. No. 3,927,391. The circuitry of that patent further does not output or select a particular value, but rather outputs only the rank of each member in a set of numbers. Also, according to the '391 patent, if two samples have the same value, they are given identical rank, which precludes the circuit from outputting a single member of a particular rank.

A rank ordering logic circuit which updates rank order within a single clock cycle is disclosed in U.S. patent application Ser. No. 220,138 by Ronald L. Engelsman, assigned to Hughes Aircraft Company. While providing an improvement in the art, the Engelsman circuit is limited to a FIFO (first-in/first-out) scheme of window management and a fixed window size while a data stream is being processed. In some radar applications, it proves desirable to have the capability to change the window size from beam to beam. Such flexibility is unavailable in the Engelsman design because all cells are not identical. Additionally, the target cell location is fixed in the Engelsman circuit, whereas it may prove desirable to have the capability to vary the target cell location.

SUMMARY OF THE INVENTION

It is therefore an object of the invention to provide improved circuitry for rank ordering numbers;

It is another object of the invention to increase the flexibility of circuitry for ranking sample values about a sample cell within a single clock cycle;

It is another object of the invention to provide a number ranking circuit for an OS CFAR detector circuit wherein the window size and target cell location may be varied;

It is another object of the invention to provide a number ranking circuit adaptable to a relatively low gate count integrated circuit design;

It is another object of the invention to provide a rank ordering circuit which is capable of outputting a sample value of selected rank;

It is another object of the invention to provide improved digital number ranking circuitry which receives a new number in a set to be ranked each clock cycle and reranks the samples in the set during the same clock cycle; and It is another object of the invention to provide such a digital number ranking circuit with the capability to output a member of the set having any particular rank during any one clock cycle.

According to the invention, ranking circuitry is provided which includes a number of identically structured rank cells for storing and ranking sample values. The identical structure of the cells results in flexibility in configuring the window size. Each rank cell includes circuitry responsive during a given clock interval to the sample value entering the sorting window, the sample value leaving the sorting window, the sample value in the rank cell and the sample value in the preceding rank cell to determine the sample value in the rank cell during the next successive clock interval.

DETAILED DESCRIPTION OF THE PREFERRED EMBODIMENTS

Figure 1:
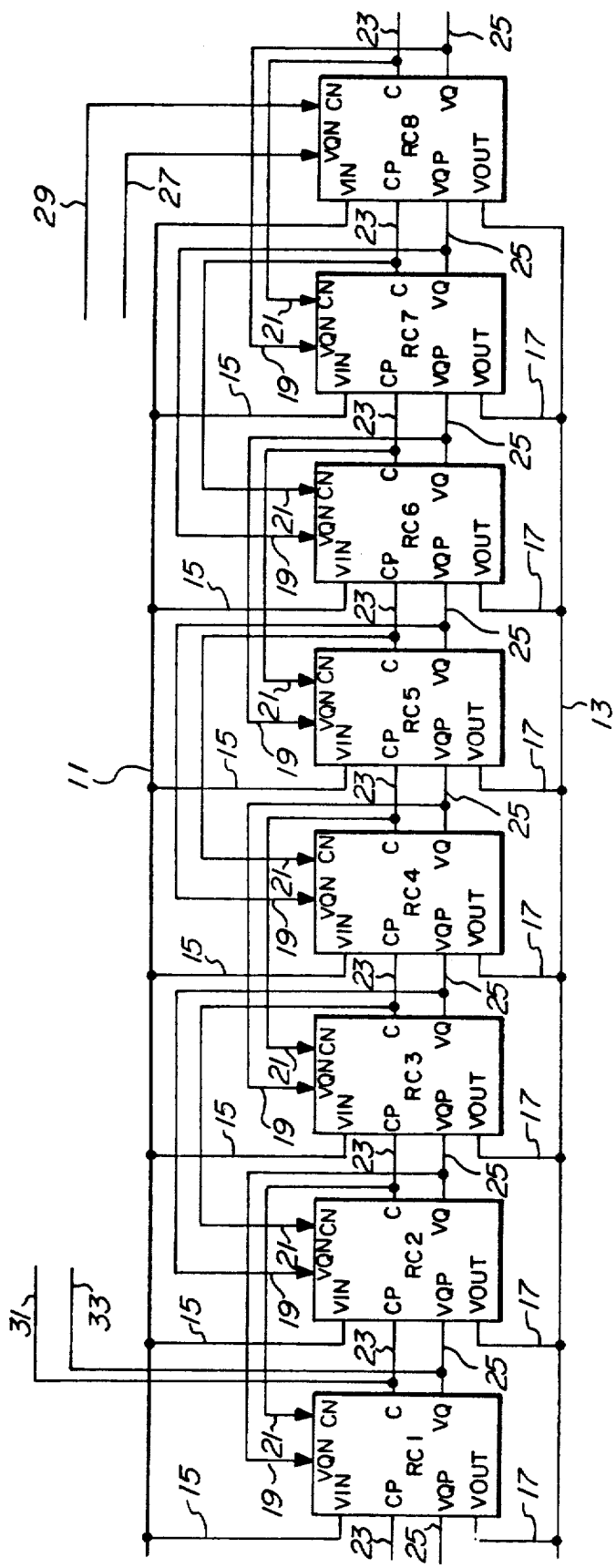
FIG. 1 is a schematic block diagram of a rank cell array according to the preferred embodiment.

A rank cell logic array according to the preferred embodiment is shown in FIG. 1. The rank cell array of FIG. 1 which is also referred to herein as a "window" or a "sorting window" includes eight identically-configured rank cells RC1, RC2, RC3, RC4, RC5, RC6, RC7, RC8. Each rank cell RC1 ... RC8 receives input signals denoted VQP, VIN, VQN, VOUT, CP, CN and provides output signals denoted C, VQ. The input signals VQP, VIN, VON, VOUT are binary numbers and, in the preferred embodiment, are representative of the magnitude of various signal samples, as is the output signal VQ. Such numbers are hereafter referred to simply as "samples" or "sample values."

The input VIN is the sample entering the sorting window. The VIN input is provided to each rank cell RC1 ... RC8 on a respective line 15. The lines 15 branch from a common bus 11.

The VOUT input to each rank cell RC1 ... RC8 is connected by a respective line 17 to a common bus 13. The sample VOUT on the bus 13 represents the magnitude of the sample leaving the sorting window.

The C output of each rank cell RC1 ... RC7 is a comparator output and is supplied over respective signal lines 23 as the CP input of the next succeeding rank cell RC2 ... RC8. The VQ output of each rank cell RC1 ... RC8 is the sample presently stored in the respective rank cell RC1 ... RC8 and is supplied over respective signal lines 25 as the VQP input of the next succeeding rank cell.

The comparator output C and the rank cell output VQ from each rank cell RC2 ... RC8 are fed back to the immediately preceding rank cell RC1 ... RC7 over respective signal lines 19, 21. The signal lines 19, 21 supply the respective C and VQ outputs to the CN and VQN inputs, respectively.

As may be appreciated, because of the identical rank cell structure employed, a number of rank cell logic arrays, each identical to that disclosed in FIG. 1, may be connected together or "cascaded." If desired, each separate array may occupy a separate chip and the chips can be interconnected.

To facilitate such interconnection, output lines 31, 33 from the first rank cell RC1 are provided to connect the C and VQ outputs of the first rank cell RC1 to the respective CN and VQN inputs of a preceding rank cell in the cascade. Similarly, input lines 27, 29 to the last rank cell RC8 are provided to receive respective C and VQ inputs from the next succeeding rank cell in the cascade. If lines 27 and 29 are not connected to a succeeding rank cell, the sample value input to the VQN input of rank cell RC8 is always zero, as is the input to the CN input of rank cell RC8.

In overall operation of the circuitry of FIG. 1, the sample values VQ residing in the rank cells RC1 ... RC8 are stored one per rank cell in descending order of magnitude, from right to left in FIG. 1. There are four different operations possible. The first operation is "insertion," which is the addition of a video signal sample to the rank window. The second operation is one of "extraction," which acts to remove a video signal sample from the rank window. The third operation accomplishes both of the above operations, insertion and extraction, in one clock cycle, which is called "replacement." The final operation is a no operation or "nop," which leaves the rank window configuration unchanged.

Figure 2:
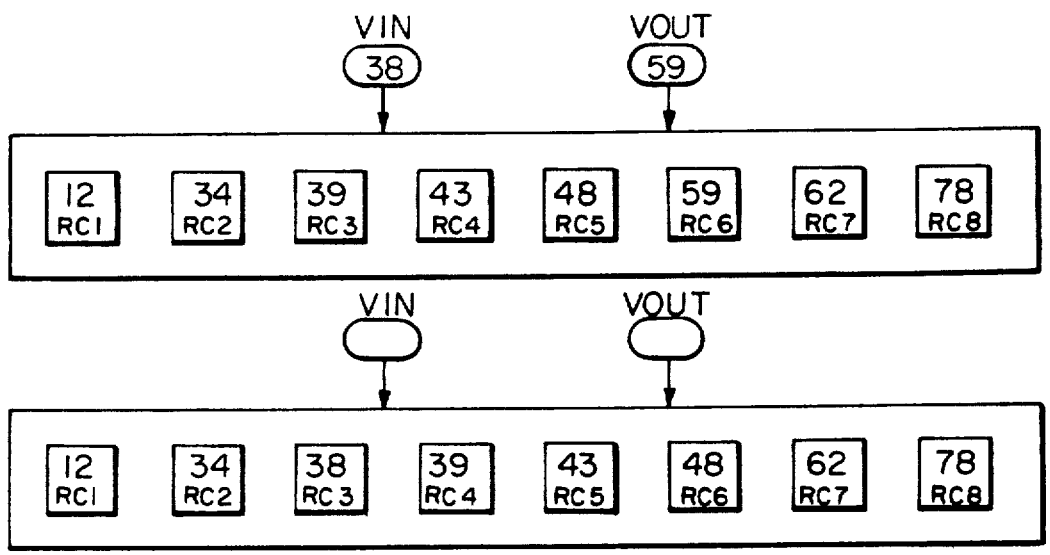
FIGS. 2-6 together constitute successive schematic rank cell diagrams useful in illustrating the operation of the preferred embodiment.

FIG. 2 shows a functional example of the operation of the rank cell registers RC1 ... RC8 of the preferred embodiment during processing. In this example, there are eight video samples in the sample window with an operation pending, that being the insertion of "38" into the window and the extraction of "59" from the window, i.e., a replacement operation. The lower half of FIG. 2 demonstrates the result of the operation. As shown, the highest ranking video sample is in the highest number rank cell RC8, and the lowest ranking video sample is in the lowest rank cell RC1.

Figure 3:
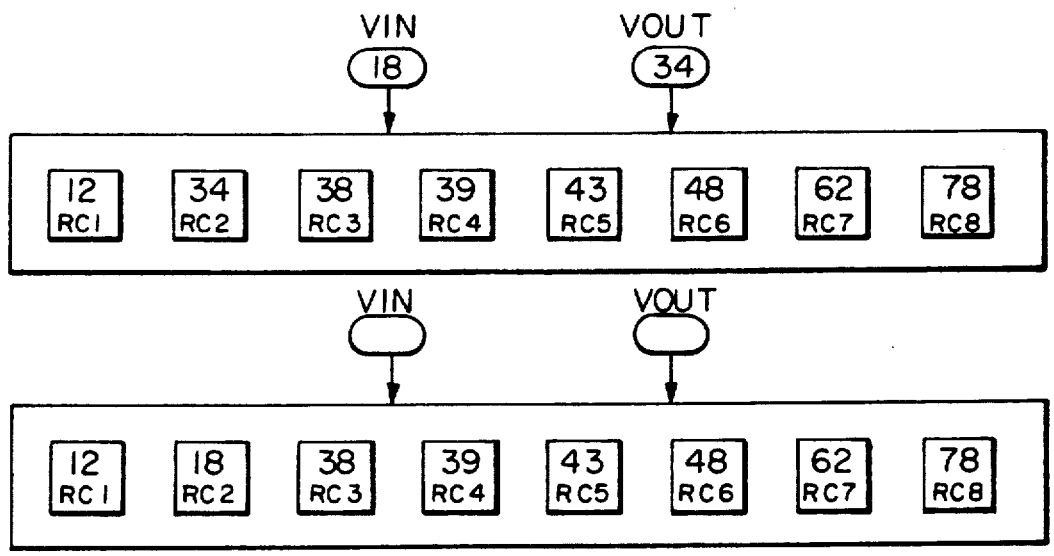

FIG. 3 is a similar example, with "18" being inserted into the window and "34" being withdrawn from the window. Notice that, in the examples of FIGS. 2 and 3, the rank cell array must be told explicitly which video sample is leaving the window and which is entering. This mode of operation is beneficial for a nonsliding window data format. However, for sliding windows (i.e., first-in/first out) formats, another mode of operation can be used wherein rank cell arrays are cascaded as discussed above, allowing proper operation without need of the video exiting the window constantly being fed to the array.

Figure 4:
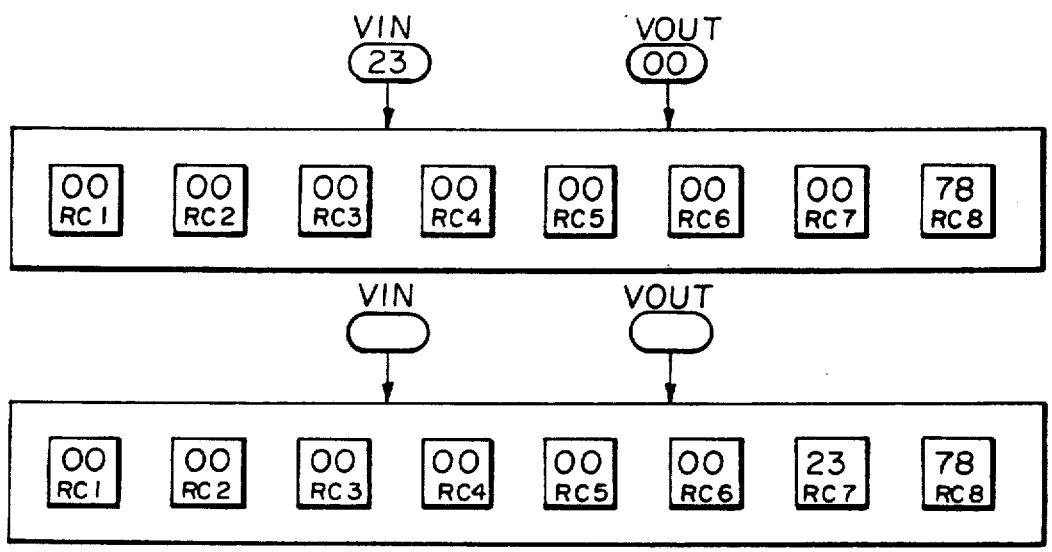

The rank cells RC1 ... RC8 may be cleared or reset by placing a sample value of zero in each rank cell RC1 ... RC8. To build up the window size after such a reset, as shown in FIG. 4, video samples must be inserted into the window one at a time, while at the same time extracting zero amplitude samples.

Figure 5:
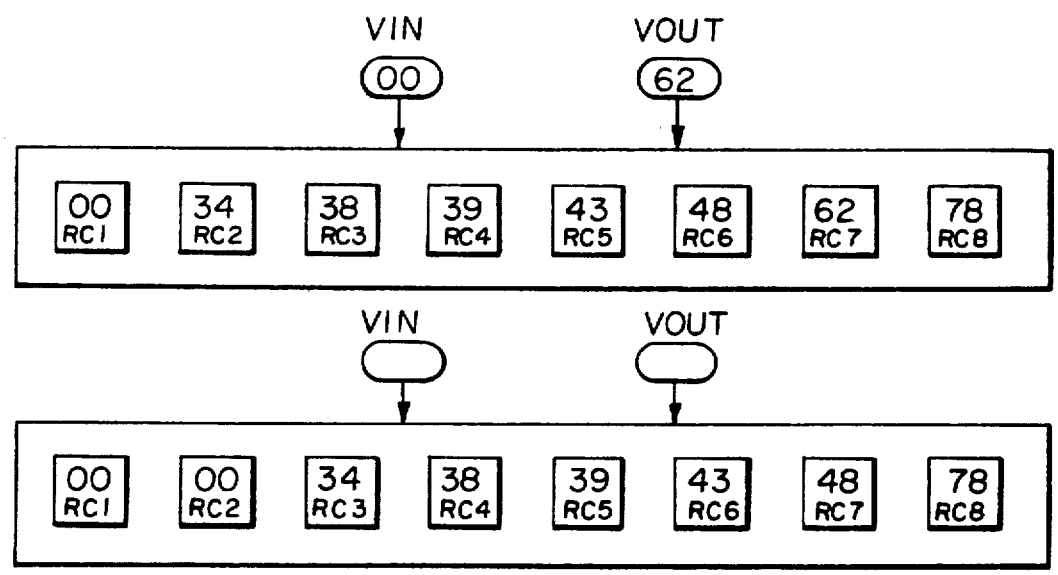

FIG. 5 illustrates a method of reducing the window size utilizing the rank cell array of the preferred embodiment. In this method, zero is inserted into the window, while, at the same time, one of the video samples is extracted from the window.

Figure 6:
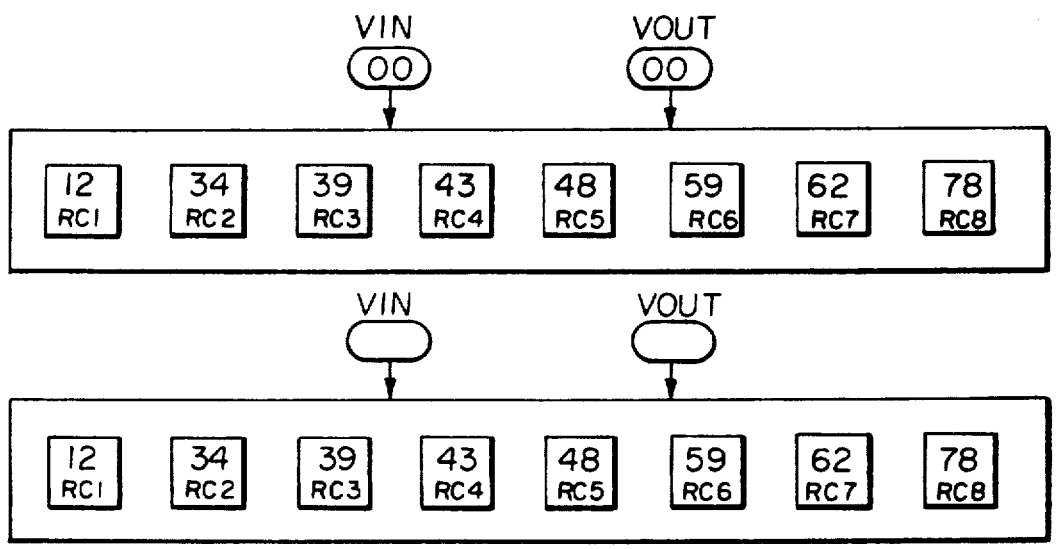

If a nop is desired, a zero is extracted from and inserted into the rank window, which is equivalent to leaving the window in the same state as before. Such a simultaneous insertion and extraction of zero into the rank cells RC1 ... RC8 is shown in FIG. 6.

During a clock cycle wherein a new sample VIN is added to the rank array RC1 ... RC8, the new sample VIN is compared to the sample VQ in each of the other rank cells RC1 ... RC8. The signals in the rank cells RC1 ... RC8 are then shifted in a manner such that there exists a vacancy for the new sample VIN such that all signals are once again ranked in descending order after the new sample VIN has been inserted into the vacant rank cell. For example, if the new sample VIN is smaller than the sample in rank cell RC4 but larger than the sample in RC3, the samples in cells RC3 ... RC1 would be shifted one cell to the left, the new sample would be placed in RC3 and the sample values in cells RC4 through RC8 would be unchanged.

During a clock cycle wherein a sample is removed from the ranking window, the sample to be removed is placed on the VOUT line 17. The sample on the VOUT line 17 is then eliminated from the ranking window, and the signals that are less in magnitude than the sample exiting the window advance one rank cell higher in the order.

The instances of a signal entering the window and leaving the window can be performed simultaneously during a single clock cycle and, typically, will be. In order to achieve simultaneous entry and exit, each rank cell RC1 . . . RC8 shown in FIG. 1 has access to the sample value VQ in the rank cell above it and below it in the ranking hierarchy, as well as to the sample entering the ranking window VIN and the sample exiting the ranking window VOUT. Each rank cell RC1 . . . RC8 contains logic which determines which sample will be clocked into its own internal sample storage register (41, FIG. 7) based on the control logic defined in Table 1. The symbols used in Table 1 are the following:

V1 = Sample entering sorting window
Vo = Sample leaving sorting window
Vq = Sample in rank cell
Vq+1 = Sample in rank cell above
Vq−1 = Sample in rank cell below
Vq(N+1) = Sample in rank cell after next clock Logic structure for effecting the operation set forth in Table 1 is illustrated further in connection with FIGS. 7 and 8.

TABLE 1

| Vo = Vq | Vi ≧ Vq | Vi ≧ Vq+1 | Vi ≧ Vq−1 | Vo > Vq | Vq (N+1) |
|---|---|---|---|---|---|
| 0 | 0 | 0 | 0 | 0 | Vq |
| 0 | 0 | 0 | 0 | 1 | Vq − 1 |
| 0 | 0 | 0 | 1 | 0 | Vq |
| 0 | 0 | 0 | 1 | 1 | VI |
| 0 | 0 | 1 | 0 | 0 | X |
| 0 | 0 | 1 | 0 | 1 | X |
| 0 | 0 | 1 | 1 | 0 | X |
| 0 | 0 | 1 | 1 | 1 | X |
| 0 | 1 | 0 | 0 | 0 | X |
| 0 | 1 | 0 | 0 | 1 | X |
| 0 | 1 | 0 | 1 | 0 | VI |
| 0 | 1 | 0 | 1 | 1 | Vq |
| 0 | 1 | 1 | 0 | 0 | X |
| 0 | 1 | 1 | 0 | 1 | X |
| 0 | 1 | 1 | 1 | 0 | Vq + 1 |
| 0 | 1 | 1 | 1 | 1 | Vq |
| 1 | 0 | 0 | 0 | 0 | Vq − 1 |
| 1 | 0 | 0 | 0 | 1 | X |
| 1 | 0 | 0 | 1 | 0 | VI |
| 1 | 0 | 0 | 1 | 1 | X |
| 1 | 0 | 1 | 0 | 0 | X |
| 1 | 0 | 1 | 0 | 1 | X |
| 1 | 0 | 1 | 1 | 0 | X |
| 1 | 0 | 1 | 1 | 1 | X |
| 1 | 1 | 0 | 0 | 0 | X |
| 1 | 1 | 0 | 0 | 1 | X |
| 1 | 1 | 0 | 1 | 0 | VI |
| 1 | 1 | 0 | 1 | 1 | X |
| 1 | 1 | 1 | 0 | 0 | X |
| 1 | 1 | 1 | 0 | 1 | X |
| 1 | 1 | 1 | 1 | 0 | Vq + 1 |
| 1 | 1 | 1 | 1 | 1 | X |

Figure 7:
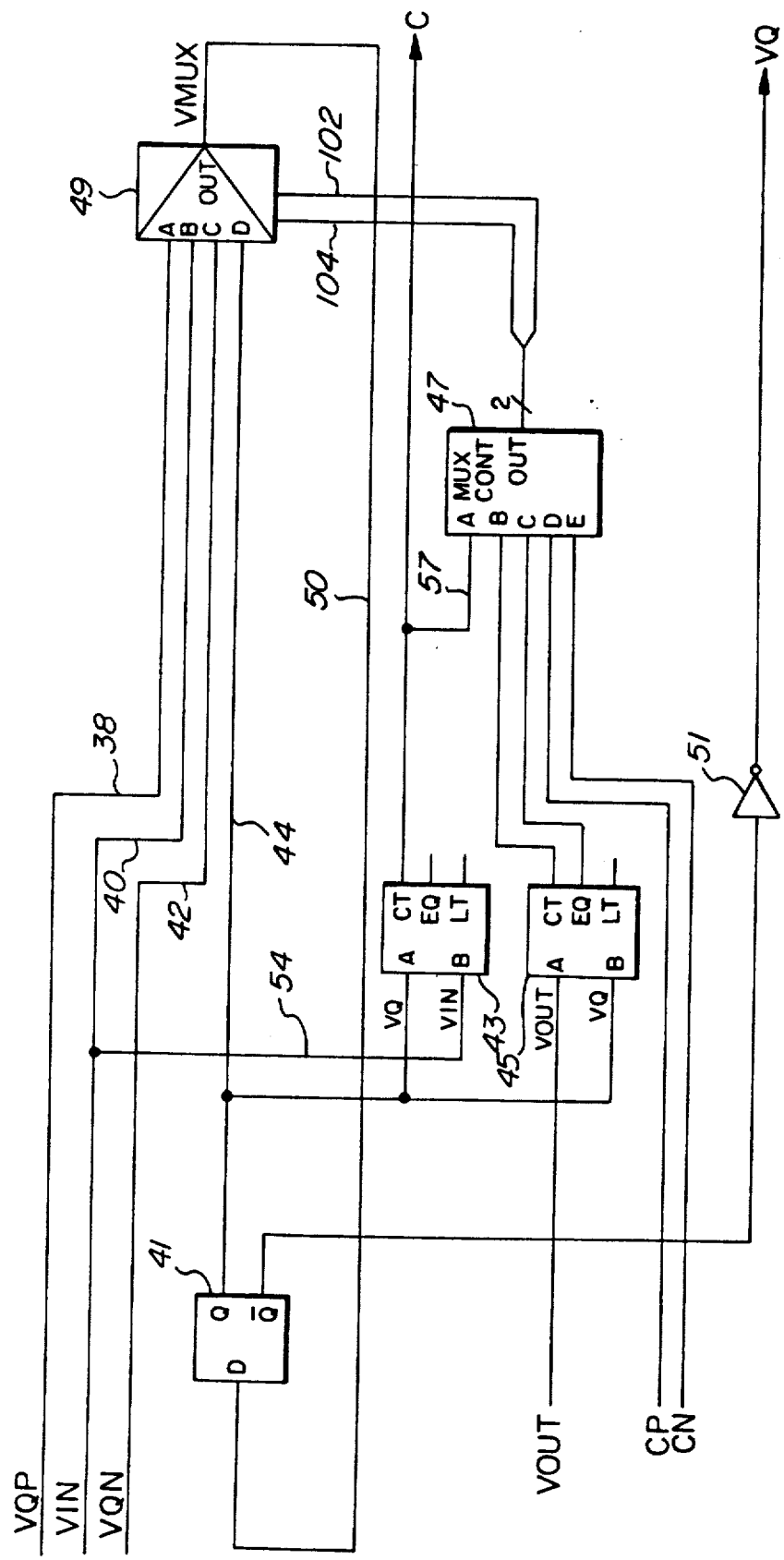
FIG. 7 is a circuit diagram illustrating the structure of a rank cell according to the preferred embodiment.

FIG. 7 discloses the structure of a rank cell RCN, N being an integer from 1 to 8 for the embodiment shown in FIG. 1. The rank cell circuit of FIG. 7 includes a D flip-flip 41, a first comparator 43, a second comparator 45, a multiplexer (MUX) 49, a multiplexer controller 47, and an inverter 51. The multiplexer 49 receives four inputs A, B, C, D over respective lines 38, 40, 42, 44. The inputs A, B, C, D to the MUX 49 are, respectively, the sample value VQP from the preceding rank cell RC(N−1), the input sample value VIN, the sample value VQN stored in the next succeeding rank cell RC(N+1), and the Q output of the D flip-flop 41. In response to a two-bit parallel output on lines 102, 104 from the MUX controller 47, the MUX 49 selects one of its inputs A, B, C, D and supplies the selected input over its output line 50 to the input D of the D flip-flop 41. The Q̄ output of the D flip-flop 41 is inverted by an inverter 51 and supplied on a line 52 as the present sample value VQ (the sample stored by rank cell RCN).

The Q output of the D flip-flop, i.e., the present sample stored by the rank cell RCN, forms the A input of the first comparator 43 and the B input of the second comparator 45. The input sample VIN is supplied to the B input of the first comparator 43 over a signal line 54, while the output sample VOUT is supplied as the A input of the second comparator 45.

The first comparator 43 thus compares the magnitude of the input sample VIN to the magnitude of the rank cell sample stored in the D flip-flop 41, i.e., the present sample. If VIN is greater than the sample contained in the D flip-flop 41, a positive output is supplied on the comparator output line C and on a line 57 to the MUX controller 47.

The second comparator 45 compares the magnitude of the VOUT sample to the magnitude of the rank cell sample stored in the D flip-flop 41. If the VOUT sample magnitude is greater than the magnitude of the rank cell sample stored in the D flip-flop 41, the comparator 45 supplies a positive logic level to the B input of the MUX controller 47. If the rank cell sample stored in the D flip-flop 41 equals VOUT, the comparator 45 supplies a positive logic level to the C input of the MUX controller 47. Such equality indicates that the rank cell sample in the D flip-flop 41 is the one selected for extraction from the ranking window.

The CP comparator input to the rank cell RCN from the preceding rank cell RC(N−1) is supplied as the D input of the MUX controller 47, while the CN comparator input to the rank cell RCN from the succeeding rank cell RC(N+1) is supplied as the E input of the MUX controller 47.

Figure 8:
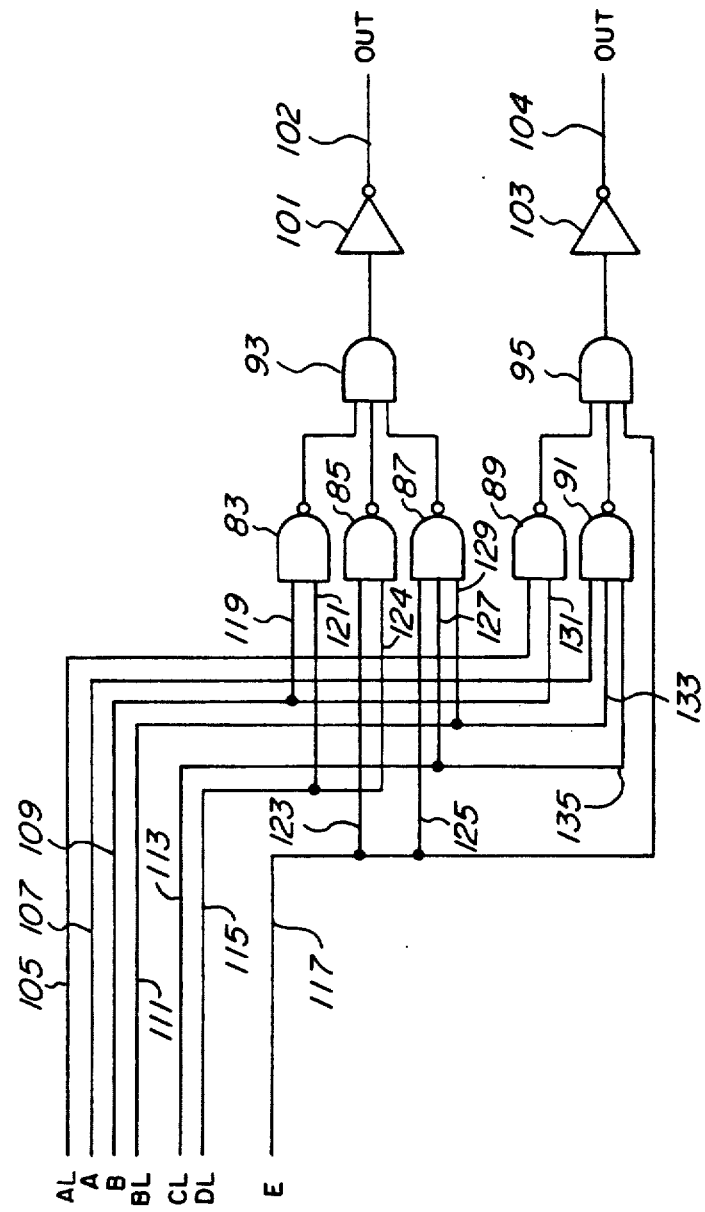
FIG. 8 is a gate level schematic of the multiplexer controller disclosed in FIG. 7.
Figure 8:
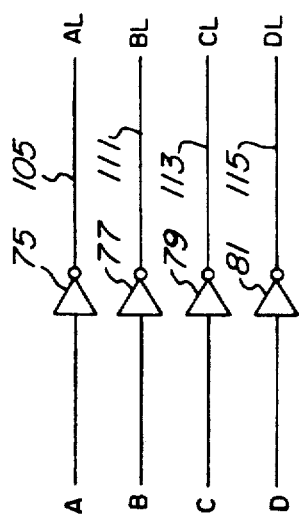

The MUX controller 47 is illustrated in more detail in FIG. 8. The MUX controller 47 includes four inverters 75, 77, 79, 81, which respectively receive the A, B, C and D MUX controller inputs described in connection with FIG. 7 and output the respective inverted values AL, BL, CL and DL. The AL input appears on a line 105 and forms a first input of a two-input NAND gate 89. The BL output appears on a line 111 and provides a first input on a line 129 to a three-input NAND gate 87 and a first input on a line 133 to a three-input NAND gate 91. The CL output appears on a line 113 and supplies a second input on a line 127 to the three-input NAND gate 87 and a second input on a line 135 to the three-input NAND gate 91. The DL output of the inverter 81 appears on a line 115 and forms a first input on a line 121 to a two-input NAND gate 83 and a first input on a line 124 to a two-input NAND gate 85.

The A input to the MUX controller 47 appears on a line 107 and forms the third input to the three-input NAND gate 91. The B input to the MUX controller 47 appears on a line 109 and provides the second input on a line 119 to the two-input NAND gate 83 and a second input on a line 131 to the three-input NAND gate 89. The E input to the MUX controller 47 appears on a line 117 and provides the second input on a line 123 to the two-input NAND gate 85 and the third input on a line 125 to the three-input NAND gate 87.

The E input on line 117 also forms a first input to a first three-input AND gate 95, which receives as its other two inputs the respective outputs of the NAND gates 89, 91. A second three-input AND gate 93 receives the respective outputs of the NAND gates 83, 85, 87 as its inputs. The output of the AND gate 93 is connected to the input of a first inverter 101, while the output of the AND gate 95 is connected to the input of a second inverter 103. The parallel outputs of the first and second inverters 101, 103 comprise the two-bit code which is supplied to the MUX 49 of FIG. 7 to select one of the respective inputs A, B, C, D of the MUX 49 as the output signal VMUX.

An example of the operation of FIGS. 7 and 8 for the situation set forth in FIG. 2 is as follows. Assume that the rank cell of FIG. 7 is the cell into which "38" should be inserted, i.e., RC3. The inputs VQP, VIN and VQN to MUX 49 on lines 38, 40 and 42 are "34," "38," "43." The contents of the D flip-flop 41 is "39," as is the input "D" to the MUX 49. The first comparator 43 thus compares "39" to "38" and outputs a logic "1." The second comparator receives VIN or "59" at its "A" input, compares it to "39" and outputs a logic "1." Since "43">"38," the input CN to the MUX controller 47 from the succeeding rank cell RC4 is a logic "1." Since "34">"38," the input CP to the MUX controller 47 from th preceding rank cell RC2 is a logic "0." Thus, the A, B, C, D and E inputs to the MUX controller 47 are 11001.

Referencing FIG. 8, the A, B, C and D inputs of inverted, providing the outputs AL, BL, CL and DL of 0011. The inputs to the NAND gates 83, 85, 87, 89, 91 are thus 0110111 on the respective lines 105, 107, 109, 111, 113, 115 and 117. The resulting outputs of the AND gates 93, 95 are "0" and "1," which are inverted to "1" and "0" respectively on lines 103 and 104. The "10" code causes the MUX 49 of FIG. 7 to gate "38" into the D flip-flop 41.

The logic in the rank cell RC4 operates concurrently such that the MUX 47 of the rank cell RC4 stores "39," available on the VQ output of the rank cell RC3. The logic of the rank cell RC2 operates concurrently such that the MUX 47 supplies its D input to the D flip-flop 41 of rank cell RC2, i.e., such that the contents of RC2 do not change.

Once the sample values are appropriately ranked in the rank cells RC1 . . . RC8, the sample having a selected rank may be readily selected. Selection may be accomplished using a simple multiplexer having each rank value VQ connected to a respective input in sequential rank order. In a radar application, one sample, e.g., the value of a video signal in a target cell, may be excluded temporarily from the selection process by comparing the target cell value to the value selected by such a multiplexer and increasing the rank to be selected by one if the comparison indicates equality.

Numerous adaptations and modifications of the just-described preferred embodiment will be apparent to those skilled in the art from the foregoing detailed description. Therefore, it is to be understood that, within the scope of the appended claims, the invention may be practiced other than as specifically described herein.

What is claimed is:

1. A rank cell array structure constructed with identically structured, successively arranged rank cells wherein each respective rank cell stores a sample and wherein said array receives a new sample in each of a plurality of successive clock intervals, each rank cell comprising:

a multiplexer means receiving as inputs the sample in the preceding rank cell, the sample in the succeeding rank cell, the new sample, and the sample in the respective rank cell, said multiplexer means being responsive to a control signal for outputting one of said samples;

a flip-flop means for storing and outputting the sample in the respective rank cell;

a first comparator means for comparing the sample in the respective rank cell to the new sample and providing a first comparator output;

a second comparator means for comparing an out sample to the sample in the respective rank cell and providing greater than and equal to comparator outputs; and control logic means responsive to the first, second and third comparator outputs and to the respective preceding and succeeding outputs of the first comparator means of each of the rank cell means preceding and succeeding said respective rank cell in said array to generate said control signal.

2. The circuitry of claim 1 wherein said control logic means comprises:

inverter means for inverting said first, second and third comparator outputs to produce inverted values thereof; and logic means supplied with said inverted values, said first and second comparator outputs and said succeeding output for producing said control signal.

3. The circuitry of claim 2 wherein said logic gate means comprises:

NAND gate means receiving as inputs said inverted values, said first and second comparator outputs and said succeeding output for providing a plurality of outputs;

AND gate means receiving the plurality of outputs of said NAND gate means and said succeeding output as inputs and providing first and second outputs; and inverter means receiving the first and second outputs of said AND gate means and providing first and second outputs.

* * * * *